United States Patent
Wegner et al.

(10) Patent No.: US 12,497,818 B2
(45) Date of Patent: Dec. 16, 2025

(54) METHOD FOR OPERATING A DOOR ACTUATOR

(71) Applicant: dormakaba Deutschland GmbH, Ennepetal (DE)

(72) Inventors: Frank Wegner, Ennepetal (DE); Chandra Gupta, Ennepetal (DE); Martin Boeckhoff, Ennepetal (DE)

(73) Assignee: DORMAKABA DEUTSCHLAND GMBH, Ennepetal (DE)

( * ) Notice: Subject to any disclaimer, the term of this patent is extended or adjusted under 35 U.S.C. 154(b) by 310 days.

(21) Appl. No.: 17/668,105

(22) Filed: Feb. 9, 2022

(65) Prior Publication Data

US 2022/0268088 A1    Aug. 25, 2022

(30) Foreign Application Priority Data

Feb. 12, 2021   (EP) ..................................... 21156793

(51) Int. Cl.
*E05F 15/73*   (2015.01)

(52) U.S. Cl.
CPC ........ *E05F 15/73* (2015.01); *E05F 2015/767* (2015.01); *E05Y 2400/44* (2013.01); *E05Y 2900/132* (2013.01)

(58) Field of Classification Search
CPC ........................... E05F 15/73; E05F 2015/767; E05Y 2400/44; E05Y 2900/132
See application file for complete search history.

(56) References Cited

U.S. PATENT DOCUMENTS

| | | | |
|---|---|---|---|
| 6,084,367 A | 7/2000 | Landert | |
| 2002/0129104 A1* | 9/2002 | Trossen | H04L 9/40 707/999.01 |
| 2016/0162785 A1* | 6/2016 | Grobman | G06F 16/2471 706/12 |
| 2021/0065489 A1* | 3/2021 | Hass | G06F 3/167 |
| 2021/0358250 A1* | 11/2021 | Venetianer | G07C 9/37 |
| 2021/0383271 A1* | 12/2021 | Slinger | G06F 11/3409 |

(Continued)

FOREIGN PATENT DOCUMENTS

| | | |
|---|---|---|
| DE | 19613178 A1 | 10/1997 |
| DE | 10234291 A1 | 2/2004 |
| EP | 1693544 A1 | 8/2006 |

(Continued)

*Primary Examiner* — Santosh R Poudel
(74) *Attorney, Agent, or Firm* — CANTOR COLBURN LLP

(57) ABSTRACT

A method for operating a door actuator of a door system, having at least one movable door leaf and a control device, which is designed to control the drive of the door leaf, and having a sensor unit, which is designed to detect at least one person in a region before the door system, and transmits information about the person to the control device, includes at least the following steps; a) detecting a person approaching the door system laterally, b) identifying a parameter set (P) having the distance (A) changing in time, the approach angle (□) and/or the speed (S) of the person relative to the door system, c) determining the desire to enter of the person approaching laterally on the basis of a comparison of the currently identified parameters with stored parameters and d) opening the door leaf only in the case of the determined desire to enter.

12 Claims, 2 Drawing Sheets

(56) References Cited

U.S. PATENT DOCUMENTS

2022/0205302 A1* 6/2022 Schimon ................ E05F 15/76
2023/0272658 A1* 8/2023 Schwitalla .............. E05F 15/73
                                                       52/173.1

FOREIGN PATENT DOCUMENTS

EP          3404184 A1    11/2018
EP          3613933 A1     2/2020
WO   WO-2017202169 A1 *   11/2017   ............... G07C 9/00

* cited by examiner

METHOD FOR OPERATING A DOOR ACTUATOR

CROSS-REFERENCE TO RELATED APPLICATIONS

This application is related to and claims the benefit of European Patent Application No. 21156793.8, filed on Feb. 12, 2021, the contents of which are herein incorporated by reference in their entirety.

TECHNICAL FIELD

The disclosure relates to a method for operating a door actuator of a door system, having at least one movable door leaf and having a control device, which is designed to control the drive of the door leaf, and having a sensor unit, which is designed to detect at least one person in a region before the door system, and transmits information about the person to the control device. The disclosure is also aimed at a door actuator of a door system having a control device for carrying out the method as well as a software program product for implementation in the control device.

BACKGROUND

EP 3 613 933 A1 discloses a method for operating an automatic door system which has a door actuator connected to a door leaf. It is indicated here that radar movement detectors are used to actuate the door movement for automatic sliding doors. For swing leaf doors, radar sensors are not common for detecting monitored regions if the sensors ultimately detect people and transmit corresponding data to a control unit to control the door system.

A method for operating an automatic door system is also known from DE 196 13 178 A1 and the door system has a door leaf which can be actuated via a door actuator. Furthermore, sensor units are proposed which cooperate with a control unit and the control unit can be actuated using sensor data such that the door system is optimally operated. Optimum operation of the door system is in particular seen as the opening behavior of the door system adapting to the passage frequency of the passing people. Thus, if a greater number of people pass the door system, the opening behavior should be designed differently to if only a single person passes the door system. Additionally, weather conditions, the time of day, the day of the week and, for example, also a temperature difference between the inside and outside of a building should also be taken into consideration.

In this case, an ideal condition is considered a door leaf only opening if a person actually wishes to pass the door system. In this respect, unnecessary opening operations are to be avoided. In particular in the case of so-called cross traffic, in which people approach the door system with a lateral movement direction running at least roughly parallel to the wall in which the door system is installed.

SUMMARY

The disclosure further improves a method for operating a door system as well as to provide such a door system, with which the method according to the disclosure can be carried out. The improvement should in particular be to provide an improved actuation of the door leaves of the door system even in the case of people approaching transversely to the door system. This should achieve an improved detection of the desire to enter of a person approaching transversely.

This is achieved by proceeding from a method, proceeding from a door actuator, and proceeding from a software program product according to the claims in connection with each of the characterizing features. Advantageous further developments of the disclosure are indicated in the dependent claims.

To achieve these advantages, the method provides for at least the following steps: a) detecting a person approaching the door system laterally, b) identifying a parameter set comprising the distance changing in time, the approach angle and/or the speed of the person relative to the door system, c) determining the desire to enter of the person approaching laterally on the basis of a comparison of the currently identified parameters with stored parameters, to which a desire to enter is assigned and stored and d) opening the door only in the case of the determined desire to enter.

The core idea of the disclosure is a learning door control to improve the actuation of the door leaf in the case of cross traffic, with either fixed parameter sets already being predefined in a memory and being retrievable, to each of which entry information is assigned and/or a learning operation can take place in addition or from the beginning, in which the controller identifies with which parameter sets a person actually wishes or does not wish to pass the door system. If a parameter set is recorded with the sensor unit, then the desire to enter is in any case determined when the person ultimately opens the door system with their own hand or sensors for closure edge protection detect the person.

However, the desire to enter can also already be detected if the person, in the later stage of the approach to the door system, approaches more clearly in their movement direction than at the beginning. The aim here is to predict as early as possible and therefore to detect whether or not a person wishes to pass a door system. Thus, the parameter sets can be stored throughout the operating time of the door system such that the movement behavior of the people can provide information as early as possible as to whether or not the person actually wishes to pass the door system.

The desire to enter is derived, in this process, from stored empirical values of the control device which can determine whether or not the person ultimately wishes to pass the door system against the background of the parameter set recorded. The latter can either be determined by clear information of the person by said person moving for example in the further stage during their approach towards the door leaf and wishing to pass the door system or even manually operating the door leaf. A greater number of stored parameter sets allows the door control to be constantly further improved. The more parameter sets available, the earlier the desire to enter can be detected from the movement behavior during the approach time of the person in the movement towards the door system.

As a result, the method according to the disclosure ensures that the door leaf does not open for example each time a person approaches transversely to the door system, but the actuation comfort of the door system should be so high that the desire to enter is also reliably detected as far as possible.

In particular, it is provided that when the parameter set according to b) is identified, the newly recorded parameter set is linked with the determination of the desire to enter, with the parameter set linked with the determined desire to enter being saved in a memory. The memory can in this case also be a component of the door actuator. Storage can be permanent or at least temporarily restricted or volatile. Advantageously, a plurality of discrete parameter sets with assigned desire to enter are stored such that if a behavior of a person is repeated and the currently identified parameter set has a high match with a stored parameter set, the desire to enter from the stored parameter set is correlated with the linked desire to enter. Thus, it can be detected whether or not a person with high probability wishes to enter the door.

In particular, it is advantageous if the stored parameters are identified on a self-learning and continuous basis by the parameter set identified according to b) being stored with the subsequent information as to whether or not the person wishes to actually pass the door system.

Furthermore, it is advantageous if the parameter set is determined by means of a person vector, which is formed from the speed of the detected person, which represents the vector length, and which is determined from the approach angle of the detected person, which represents the vector direction, with the person vector changing in time during the approach time of the person to the door system, with the person vector changing in time being stored in a memory.

The method is also in particular characterized in that the control device, with the continuous detection of a number of people over time, the identification of the respective parameter set and the determination of whether or not the people pass the door system, learns to derive a desire to enter of a person through the door system from the specific parameter set and optimizes over time. Thus, the data quality of parameter sets with assigned desires to enter, which have already been stored, can be further improved to an extent such that the data quality increases in quality in the course of a longer operating time of the door system.

In particular, storage is carried out such that a number of movement vectors is continuously stored in the memory, linked with the information as to whether or not the person has also actually passed the door system.

The sensor unit in particular has a radar sensor or a camera with an image processing module. If the sensor unit is designed as a radar sensor, it has a central main detection region with a high detection signal, to which lateral areas adjoin in which a reduced detection signal is emitted by the sensor unit, with the method step c) preferably only being carried out when the sensor unit detects the approach of a person from the lateral areas to the door system. If the sensor unit detects a person in the main detection region, from which the person also approaches the door leaf at an angle, then a desire to enter must in principle be assumed.

Further advantageously, a plurality of parameter sets can be combined in the memory when they relate to person vectors very similar to one another and underlying which is a very similar or the same movement behavior of the people. Similarities of parameter sets can also be used to correlate them with one another, in particular to generate new parameter sets therefrom.

The parameter sets relate in particular to the person vectors having three items of information: On the one hand, the vector for its own determination has a vector angle and a vector length which represent the angle of the approach of the person and the speed of the approach of the person. In this case, the other information that can be a component of the parameter set is the distance the person still has from the door system. If two of three parameters match and the deviation of the third parameter is only a low percentage, for example 5% to 10%, then the parameter sets can be combined. In particular, when comparing currently recorded parameter sets with stored parameter sets, similarity criteria must be used such that the individual components of the parameters diverge for example 5% to 10% from one another in order to still predict a desire to enter.

According to an alternative solution and in particular an advantageous further development of the disclosure, the memory can be pre-programmed with parameter sets and an assigned entry behavior. When putting the door system into service, the memory must not in this respect initially be empty in order to detect and store a desire to enter only with the first stored parameter sets, but rather pre-set parameter sets with assigned entry behavior can be present in the memory which can already be used immediately when the door system is put into service.

Thus, over the service life of the door system, it can be provided that further parameter sets are added to the pre-programmed parameter sets in order to correlate these parameter sets with one another, in particular also continuously.

Features and details, which are described in connection with the method according to the disclosure, also apply here in connection with the door actuator according to the disclosure and vice versa. In this case, the features mentioned in the description and in the claims may each be essential to the disclosure individually by themselves or in combination. In particular, a door actuator is being protected, with which the method according to the disclosure, in particular the method according to one of the claims, can be carried out.

Thus, the disclosure is also aimed at a door actuator of a door system having a control device for carrying out the method according to the above description. In this case, the control device for carrying out the method can have a memory.

The disclosure is also aimed at a door system for carrying out the method according to the disclosure. The door system can comprise at least one, in particular a plurality of, in particular two, door leaves. The door system advantageously has a door actuator according to the disclosure. The door system or the door actuator can comprise a memory and/or a processor for carrying out the method.

The door system can be designed as an in particular automatic sliding door system, as a folding leaf door system, as a pivot leaf door system or as a revolving door system.

Features and details, which are described in connection with the method according to the disclosure and the door actuator according to the disclosure, also apply in connection with the door system according to the disclosure and vice versa.

The disclosure is also aimed at a software program product for carrying out a method according to one of the method claims and/or for operating a door actuator according to one of the device claims.

Features and details, which are described in connection with the method according to the disclosure and the door actuator according to the disclosure as well as the door system according to the disclosure, also apply here in connection with the software program product according to the disclosure and vice versa.

BRIEF DESCRIPTION OF THE DRAWINGS

Further measures that improve the disclosure will be outlined in greater detail below together with the description of a preferred exemplary embodiment of the disclosure on the basis of the figures, which show.

DETAILED DESCRIPTION OF THE DRAWINGS

Figure 1:
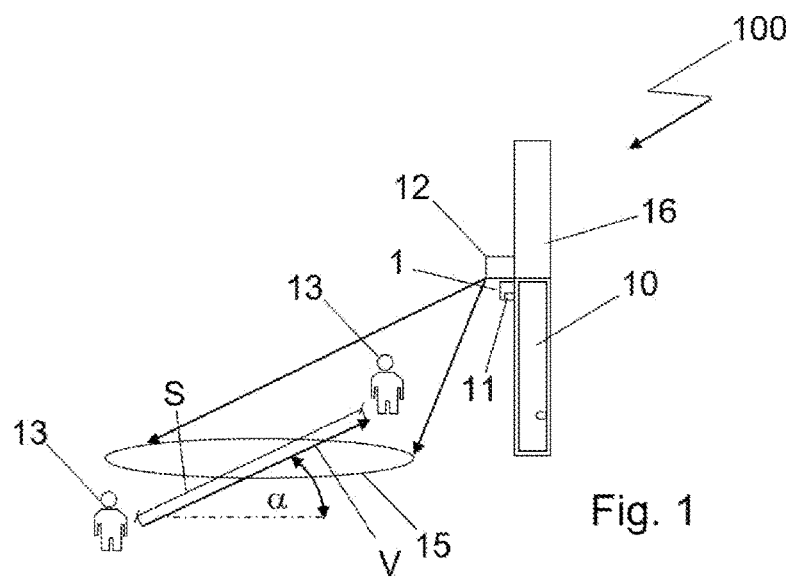
FIG. 1 a schematic view of the door system in a side representation with a person who passes transversely through a sensor detection region, FIG. 2 a door system in a plan view with a plurality of people who pass through the sensor detection region from respective directions, and FIG. 3 a flow diagram to represent the method according to the disclosure.

FIG. 1 shows the door system 100 with a door actuator 1 and a movable door leaf 10 which is operatively connected to the door actuator 1 and can be pivoted with the same. The door system 100 also has a sensor unit 12, which is connected to a control device 11, with the control device 11 for example being part of the door actuator 1 or being designed so as to form a structural unit with the same.

The sensor unit 12 can cover a sensor detection region 15 in a region before the door system 100, and when a person 13 passes through the sensor detection region 15, the sensor unit 12 designed in particular as a radar sensor can record the speed S and the approach angle α of the person 13 at which the person 13 moves laterally towards the door system 100. The movement vector V is formed from the speed S and the approach angle α, with the speed S being represented by the length of the movement vector V. If the person 13 approaches the door system 100 from one side and the angle α at 0° represents an orthogonal direction perpendicular to the closed door leaf 10, then the angle α will be for example greater than 45° when the person 13 approaches laterally. If the person 13 approaches the door system 100 at the approach angle α=90°, then the person 13 moves parallel along the wall 16 in which the door system 100 is installed.

Figure 2:
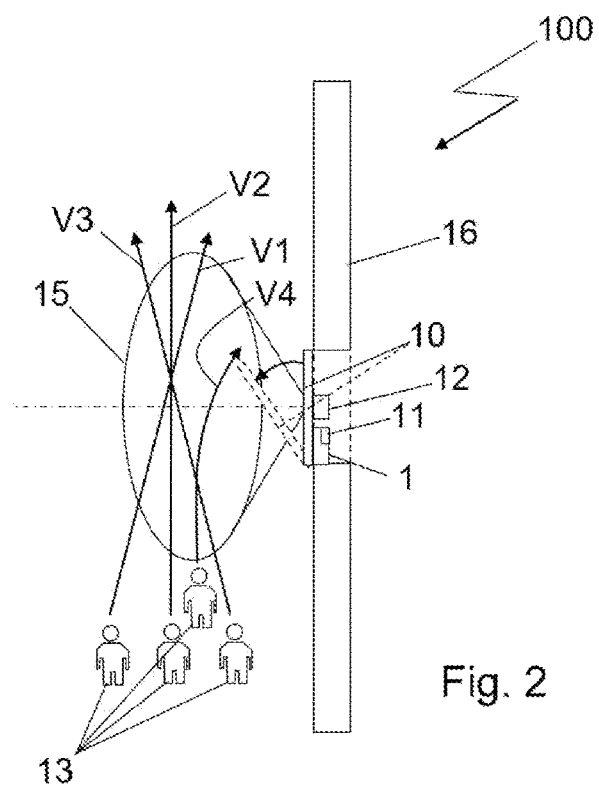

FIG. 2 shows a plan view of the door system 100 with the door actuator 1, the door leaf 10 and the control device 11 and a sensor unit 12 is shown which can cover the sensor detection region 15. Four people 13 are also shown who approach the sensor detection region 15 from different directions.

The movement vectors V1 to V4 have, in relation to FIG. 1, different approach angles α with an angle position according to FIG. 1 such that it can be detected from the length of the movement vectors V1 to V4 in conjunction with the approach angle α whether or not a person 13 has a desire to enter the door system 100.

The person 13, who enters the sensor detection region 15 with the movement vector V1, has, in this case probably with higher probability, an intention to enter than the person 13, who approaches the sensor detection region 15 with the movement vector V3 and crosses through it. The same applies to the tangentially running movement vector V2, which in this respect represents a simple cross movement, whereas the movement vector V4 represents a clear intention to enter and pass the door system 100.

Figure 3:
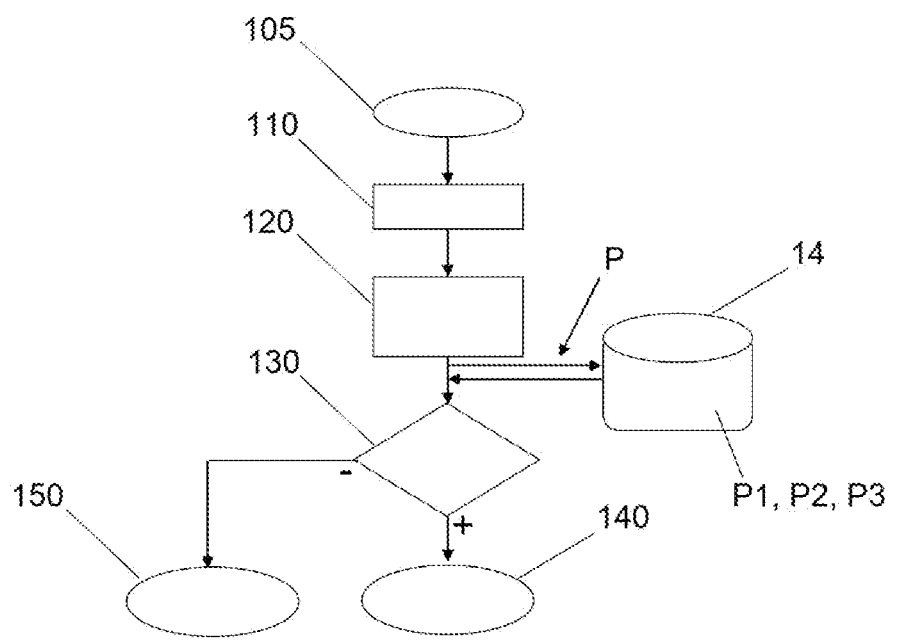

The method according to the disclosure is represented in the form of a diagram in FIG. 3. In this case, the method provides for the following steps proceeding from the condition 105 of a closed door leaf: detecting 110 a person 13 approaching the door system 100 laterally, identifying 120 a parameter set P comprising the distance A changing in time, the approach angle α and/or the speed S of the person 13 relative to the door system 100 and determining 130 the desire to enter of the person approaching laterally on the basis of a comparison of the currently identified parameters with stored parameter sets P1, P2, P3 to which a desire to enter is assigned and stored. The comparison takes place in this case such that a parameter set P1, P2, P3 that is as similar as possible is identified in the memory and the desire to enter stored with the similar parameter set P1, P2, P3 forms the basis of the new evaluation of the current parameter set. It is assumed for the evaluation that if, when the older, stored parameter set P1, P2, P3 was recorded, the person in turn passed the door system, the person 13 or another person will do the same again on the next approach with the same or similar parameters and will pass the door system.

In the step of determining 130, there is the possibility that the desire to enter is confirmed, represented with a plus sign, such that ultimately the step 140 of opening the door leaf follows in the case of the determined desire to enter. If the determination 130 is negative such that there is no desire to enter, represented by a minus sign, then step 150 follows according to which the door leaf remains closed.

In this case, between the step 120, according to which the parameter set P is identified, and determining the desire to enter 130, the parameter sets P can be exchanged with a memory 14, with the memory 14 for example being part of the control device 11. The parameter sets P1, P2, P3 linked with the respectively actually determined desire to enter can be stored in the memory 14, with it also being conceivable that the memory 14 can contain pre-stored parameters P, which are represented by a plurality of parameter sets P1, P2, P3, etc. The newly added parameter sets P in conjunction with the determined desires to enter can in this case be included with the pre-stored parameter sets P1, P2, P3, etc., and the parameter sets P can also be correlated with one another.

The design of the disclosure is not restricted to the preferred exemplary embodiment indicated above. In fact, a number of variants is conceivable which make use of the solution represented even in the case of essentially different embodiments. All features and/or advantages emerging from the claims, the description or the drawings, including constructive details or spatial arrangements, may be essential to the disclosure by themselves and in the most varied combinations.

The invention claimed is:

1. A method for operating a door actuator of a door system, having at least one movable door leaf and having a control device, which is designed to control the drive of the door leaf, and having a sensor unit, which is designed to detect at least one person in a region before the door system, and transmits information about the person to the control device, the method comprising the following steps:
   a) detecting a person approaching the door system laterally,
   b) identifying a parameter set (P) comprising approach angle (a) of the person relative to the door system and/or speed(S) of the person relative to the door system,
   c) determining the desire to enter of the person approaching laterally on the basis of a comparison of the currently identified parameters with stored parameters, to which a desire to enter is assigned and stored,
   d) opening the door leaf only in the case of the determined desire to enter, and combining the plurality of parameter sets (P) including the approach angle and the speed(s) and correlating the parameter sets in order to generate new parameter sets for the door system.

2. The method according to claim 1,
   wherein
   the parameter set (P) identified in b) and linked with the desire to enter determined in c) are stored in a memory.

3. The method according to claim 1,
   wherein
   the stored parameters are identified on a self-learning and continuous basis by the parameter set (P) identified according to step b) being stored with the subsequent information as to whether or not the person has also actually passed the door system.

4. The method according to claim 1, wherein
the parameter set (P) is determined by a person vector (V), which is formed from the speed (S) of the detected person, which represents the vector length, and which is determined from the approach angle (a) of the detected person, which represents the vector direction, wherein the person vector (V) changes in time during the approach time of the person to the door system, wherein the person vector (V) changing in time is stored in a memory.

5. The method according to claim 1, wherein
the control device continuously over time:
   detects a number of people,
   identifies the respective parameter set (P), and
   determines whether or not the people pass the door system, learns to derive a desire to enter of a person through the door system from the specific parameter set (P) and optimizes over time.

6. The method according to claim 1, wherein
a number of movement vectors (V) is continuously stored in the memory linked with the information as to whether or not the person has also actually passed the door system.

7. The method according to claim 1, wherein
the sensor unit is formed by a radar sensor or by a camera with an image processing module, wherein the sensor unit has a central main detection region (H) with a high detection signal, to which lateral areas (Z1, Z2) adjoin in which a reduced detection signal is emitted by the sensor unit, wherein the method step c) is only carried out when the sensor unit detects the approach of a person from the lateral areas to the door system.

8. The method according to claim 1, wherein
the memory is pre-programmed with parameter sets (P) and an assigned entry behavior.

9. The method according to claim 1, wherein
the parameter sets (P) with the assigned entry behavior added over the service life of the door system are correlated with the pre-programmed parameter sets (P) and continuously expanded.

10. A door actuation method for a door system comprising a control device for:
   a) detecting a person approaching the door system laterally,
   b) identifying a parameter set (P) comprising approach angle (a) of the person relative to the door system and/or speed(S) of the person relative to the door system,
   c) determining the desire to enter of the person approaching laterally on the basis of a comparison of the currently identified parameters with stored parameters, to which a desire to enter is assigned and stored,
   d) opening the door leaf only in the case of the determined desire to enter, and combining the plurality of parameter sets (P) including the approach angle and the speed(s) and correlating the parameter sets in order to generate new parameter sets for the door system.

11. A door system for carrying out a method for operating a door actuator of a door system, comprising at least one door leaf and at least one door actuator of the door system having a control device, the method including following steps:
   a) detecting a person approaching the door system laterally,
   b) identifying a parameter set (P) comprising approach angle (a) of the person relative to the door system and/or speed (S) of the person relative to the door system,
   c) determining the desire to enter of the person approaching laterally on the basis of a comparison of the currently identified parameters with stored parameters, to which a desire to enter is assigned and stored,
   d) opening the door leaf only in the case of the determined desire to enter, and combining the plurality of parameter sets (P) including the approach angle and the speed(s) and correlating the parameter sets in order to generate new parameter sets for the door system.

12. A non-transitory computer readable medium storing instructions for carrying out a method 1 for operating a door actuator of a door system and/or for operating the door actuator of the door system having a control device, the method including following steps:
   a) detecting a person approaching the door system laterally,
   b) identifying a parameter set (P) comprising approach angle (a) of the person relative to the door system and/or speed (S) of the person relative to the door system,
   c) determining the desire to enter of the person approaching laterally on the basis of a comparison of the currently identified parameters with stored parameters, to which a desire to enter is assigned and stored,
   d) opening the door leaf only in the case of the determined desire to enter, and combining the plurality of parameter sets (P) including the approach angle and the speed(s) and correlating the parameter sets in order to generate new parameter sets for the door system.

* * * * *